United States Patent [19]

Bailey et al.

[11] 4,306,141
[45] Dec. 15, 1981

[54] MECHANICAL ASTROLOGICAL CALCULATING DEVICE

[76] Inventors: Joan F. Bailey, 280 Alto Dr., Oak View, Calif. 93022; Linnea C. Richards, 525 Ave. Del Recreo, Ojai, Calif. 93023

[21] Appl. No.: 86,694

[22] Filed: Oct. 22, 1979

[51] Int. Cl.³ .............................................. G06C 27/00
[52] U.S. Cl. ..................................... 235/78 R; 235/84
[58] Field of Search ............. 235/70 A, 78 R–78 RC, 235/83, 84, 85 R, 85 FC, 88 R–88 RC, 41, 116

[56] References Cited

U.S. PATENT DOCUMENTS 3,360,195  12/1967  Fisher ................................ 235/78 N
4,149,068  4/1979   Simon ................................ 235/78 R Primary Examiner—L. T. Hix
Assistant Examiner—Benjamin R. Fuller
Attorney, Agent, or Firm—Keith D. Beecher

[57] ABSTRACT

A mechanical calculating device is provided which is particularly useful in determining the relationship of the heavenly bodies to specific heavenly positions at different times. The device, in the embodiment to be designed, comprises a base, a first disc rotatably mounted on the base, which has inscribed about its periphery a ring scale divided into twelve sectors each marked with a different Zodiacal sign, and each sector is subdivided into thirty indices each representing one degree of arc. A plurality of transparent discs are rotatably mounted on the base in concentric relationship with one another and with the first disc, the latter discs representing the sun, the moon and the various planets. The latter discs are each provided with an identifying tab, and each is inscribed with a series of lines extending outwardly from a common point adjacent to the tab at selected angles to one another, with each line having a selected color. In operating the device, the various discs are rotated to specific angular positions, as indicated by the tabs and which are established by the astrological calendar known as the Ephemerus which charts the positions of the planets at particular times and dates. In this manner, the transiting planets may be seen in relation to one another.

4 Claims, 3 Drawing Figures

INNER DISCS

MECHANICAL ASTROLOGICAL CALCULATING DEVICE

BACKGROUND

It is widely believed that the relationship of the planets and other heavenly bodies to a person or place at some fixed time, or at different times, such as the time of a person's birth, or the time of some other event or occurrence, which may take place in his or her life, has an effect upon that person or upon the event. Astrology has a long historical past, and has been held in high esteem in Chaldea, China, India and Greece, to mention some of the ancient cultures, and astrology has been the subject of a vast amount of literature published in almost all known languages.

At the outset, it should be emphasized that the present invention is not particularly concerned with any interpretation or any meaning which may be attached to the relationship of the heavenly bodies to any individual or event. Rather, the invention is concerned primarily with a mechanical device which enables an easy determination to be made of the aspects of the transiting planets.

The plotting of the relative positions and relations of the heavenly bodies at different times and places, that is, the casting of the horoscope, is an exact science, and the use of the mechanical device of the present invention is not dependent upon anything which is not mathematically ascertainable and provable.

DETAILED DESCRIPTION OF THE ILLUSTRATED EMBODIMENT

Figure 1:
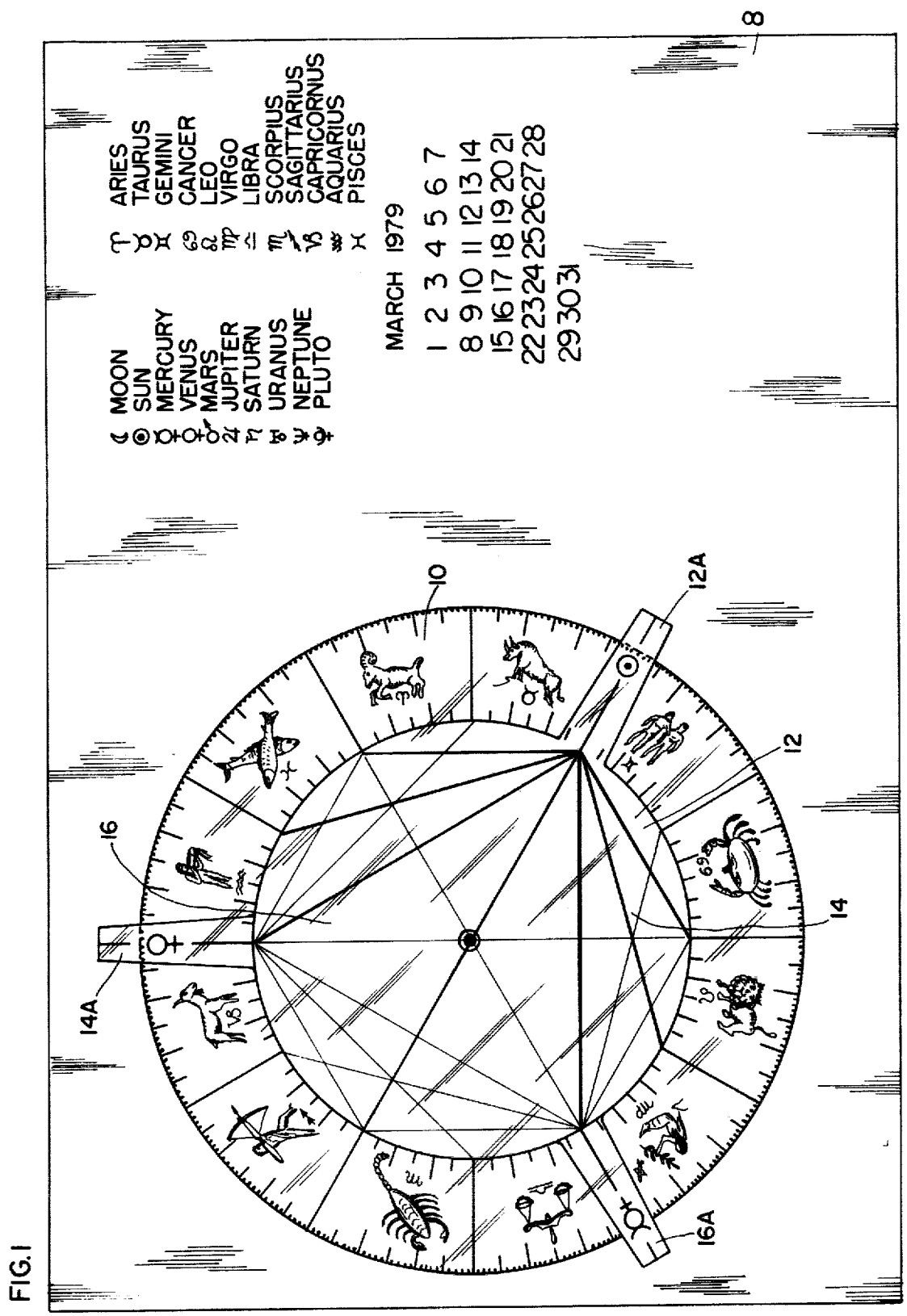
FIG. 1 is a representation of one embodiment of the invention in which the various discs representing the calculating device are mounted on a rigid upright base, adapted to be supported on a desk or table, with other indicia, such as a calendar and certain astrological information also being inscribed on the base.
Figure 2:
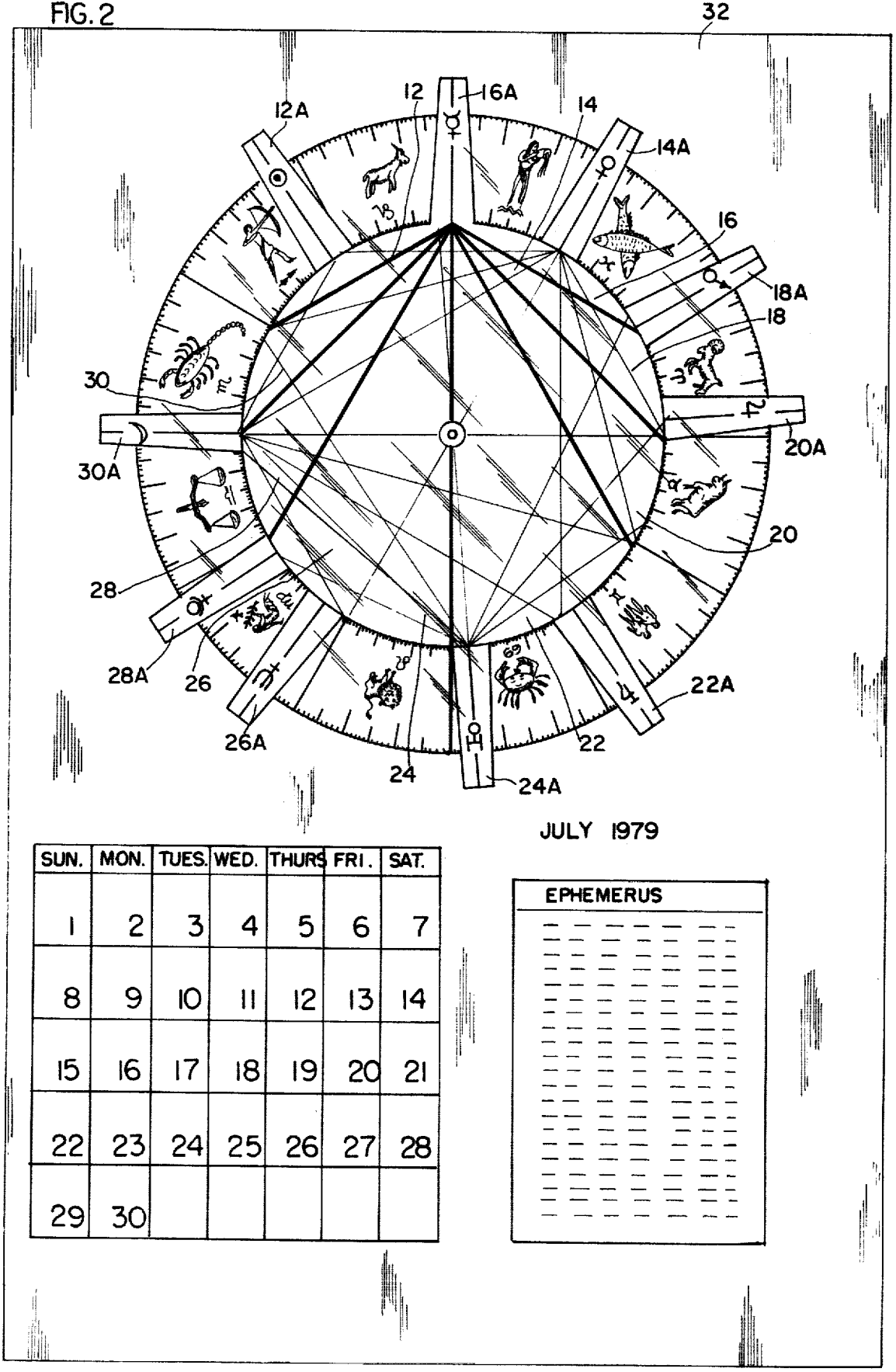
FIG. 2 is a representation of a second embodiment of the invention in which the various discs of the calculating device and other information, are mounted, for example, on a soft cardboard base adapted to be suspended from a wall.

In each of the embodiments of FIGS. 1 and 2, a first disc which has a greater diameter than the other discs is rotatably mounted on a base 8 to constitute an outer wheel 10. The outer wheel 10 has the twelve Zodiacal signs inscribed about its periphery, with each sign containing 30 degrees of celestial arc. The periphery of the outer wheel is also calibrated to represent 0°–360° of celestial arc.

Figure 3:
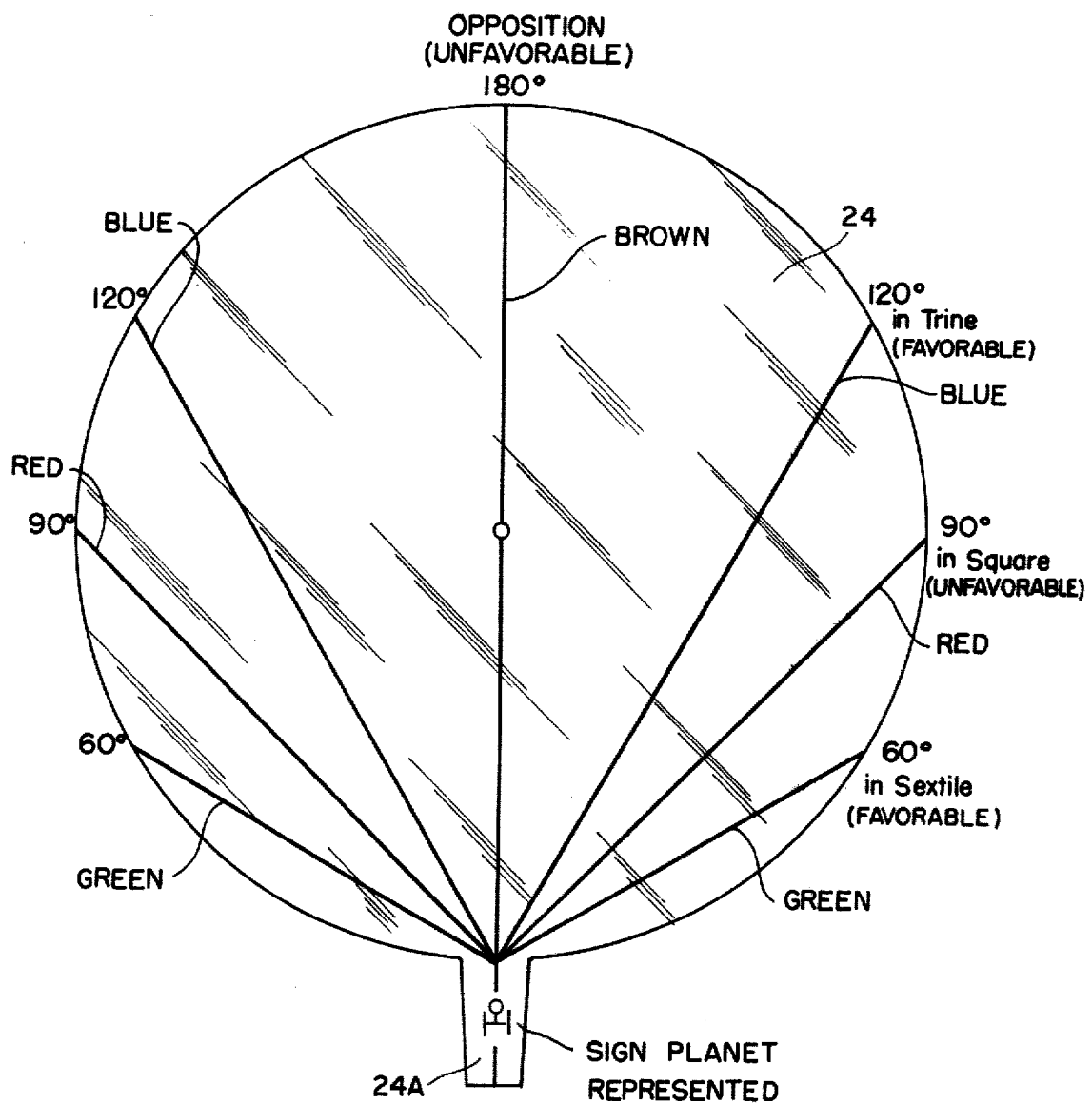
FIG. 3 is a representation of one of the discs used in the embodiments of FIGS. 1 and 2.

The embodiment of FIG. 1 includes, for example, three additional discs 12, 14, 16 which are rotatably mounted to be concentric with one another and concentric with the outer wheel, and to be individually rotatable about the common axis. The three additional discs is equipped with respective tabs 12A, 14A, 16A bearing identifying symbols. The three discs 12, 14, 16 represent, for example, the sun, the moon, and Venus. Each of the discs is inscribed with differently colored lines, as shown in FIG. 3.

The embodiment of FIG. 2, for example, has ten discs 12, 14, 16, 18, 20, 22, 24, 26, 28, 30 representing respectively the sun, the moon, and the eight planets Mercury, Venus, Mars, Jupiter, Saturn, Uranius, Neptune and Pluto. These discs, likewise, are rotatable about the common axis on a base 32.

The discs 12, 14, 16, 18, 20, 22, 24, 26, 28, 30 are formed of appropriate transparent material such as vinyl plastic, so that all the differently colored lines may be observed for the various angular positions to which the discs are set. The base 8 in the embodiment of FIG. 1 may be formed, for example, of a translucent "milk-glass" plastic to facilitate the reading of the device.

The base 8 of the embodiment of FIG. 1 also has the planets and corresponding symbols, as well as the signs of the Zodiac inscribed thereon, as well as a calendar. The base 32 of the embodiment of FIG. 2 also has the Ephemerus calendar printed thereon, since reference to the Ephemerus calendar is necessary when the device is operated.

In the operation of the devices of FIGS. 1 and 2, reference is made to the Ephemerus calendar, and the positions of the various planets. The tabs of the inner discs, which represent the planets, are then set to corresponding indices on the outer wheel by reference to the Ephemerus so as to indicate the current position of the planets on any particular day. After all of the discs have been set, the intersections of the various lines on the various discs with the indices on the outer wheel are observed, thus giving a reading for general public use.

To use the device as a personal calculator, tabs or other indicators (not shown) may be placed on the appropriate indices on the outer wheel according to one's horoscope. Thus, in addition to the reading for the general public, one will have a reading in relationship to one's personal chart.

It will be appreciated that although various embodiments of the invention have been shown and described, modifications may be made. It is intended in the claims to cover such modifications which come within the true spirit and scope of the invention.

What is claimed is:

1. A calculating device for determining the relative positions of the planets and other heavenly bodies at any particular time, including: a base; a wheel rotatably mounted on the base and having peripheral calibrations representing degrees about a complete circle; and a plurality of equal-diameter discs of a diameter less than the diameter of the wheel rotatably mounted on said base in concentric relationship with one another and with said wheel for individual rotation about a common axis, each of said discs representing a particular heavenly body and each having an integral indexing tab extending radially outwardly to the periphery of said wheel to be set to a selected calibration displayed by said wheel and having a symbol therein representing the corresponding heavenly body.

2. The calculating device defined in claim 1, in which said discs are formed of transparent material, and each of said discs is inscribed with a series of lines colored in accordance with a selected color code extending outwardly from a point adjacent to the corresponding tabs at selected angles to one another.

3. The calculating device defined in claim 1, in which the base is formed of a rigid material.

4. The calculating device defined in claim 1, in which said base has information inscribed thereon useful in the operation of the device.

* * * * *